J. F. SIMMONS.
HOSE COUPLING.
APPLICATION FILED MAY 23, 1916.
1,234,812.
Patented July 31, 1917.
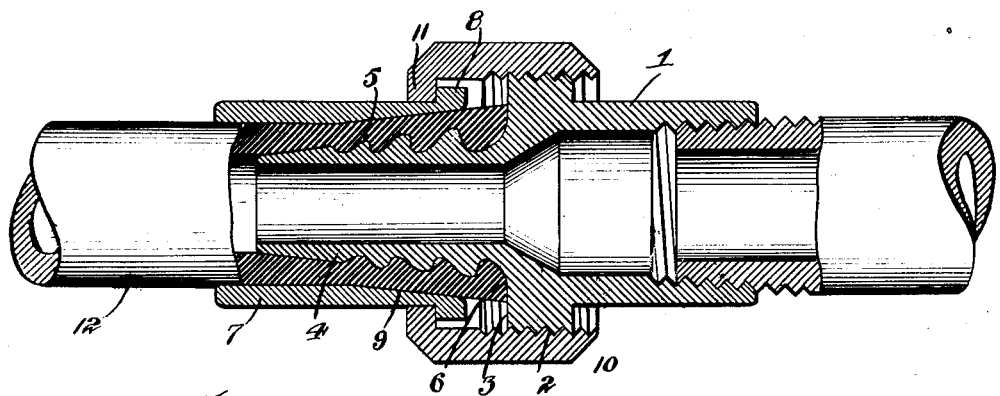
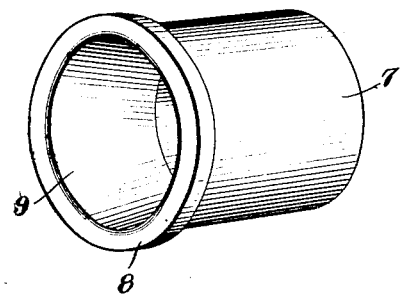
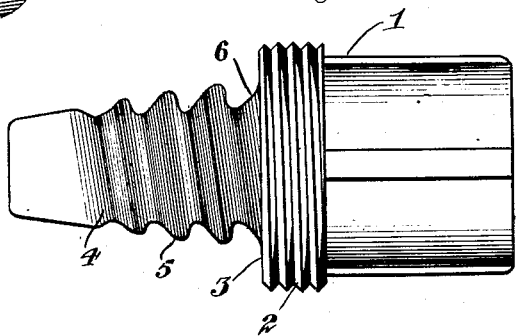
Witnesses
F. Hindridge
J. Wilcox
Inventor
James F. Simmons.
By Victor J. Evans
Attorney

UNITED STATES PATENT OFFICE.

JAMES F. SIMMONS, OF PARKERSBURG, WEST VIRGINIA.

HOSE-COUPLING.

1,234,812.      Specification of Letters Patent.      Patented July 31, 1917.

Application filed May 23, 1916. Serial No. 99,401.

*To all whom it may concern:*

Be it known that I, JAMES F. SIMMONS, a citizen of the United States, residing at Parkersburg, in the county of Wood and State of West Virginia, have invented new and useful Improvements in Hose-Couplings, of which the following is a specification.

This invention relates to hose couplings and it consists in the novel features hereinafter described and claimed.

An object of the invention is to provide a coupling of the character indicated which is of simple and durable structure and which is adapted to securely hold a hose in connection with a pipe section in a manner to prevent leakage at the joint when the hose and the pipe is subjected to excessive pressure from within.

In the accompanying drawing:—

Figure 1 is a longitudinal sectional view of the hose coupling.

Fig. 2 is a perspective view of one of the members thereof.

Fig. 3 is a side elevation of the other member thereof.

The hose coupling comprises a member 1 which is open from end to end and which is provided at a point between its ends with an exteriorly located thread 2. The intermediate portion of the member 1 adjacent one end of the thread 2 is provided with a shoulder 3. The said member 1 is further provided with a nipple 4 the exterior surface of which is approximately conical and which is provided with a coarse thread 5. A conical portion 6 is interposed between the thread 5 and the shoulder 3 and the said portion 6 is provided with a concaved exterior surface.

The coupling also includes a hollow member 7 which is provided at one end with an annular shoulder 8. The member 7 is bell mouthed or funnel shaped at one end as at 9. The member 7 is adapted to surround the nipple 4 of the member 1. A union nut 10 surrounds one end of the member 7 and the intermediate portion of the member 1. The said nut 10 is provided with an annular flange 11, which bears against one side of the shoulder 8 and is internally threaded to engage the thread 2 of the member 1.

In assembling the parts the member 7 is placed in position upon one end of the hose 12 with the union nut 10 surrounding the said member 7. The end of the hose 12 is then slipped over the conical surface of the nipple 4 until the end of the said hose comes in contact with the exterior surface of the boss 6 of the member 1. The nut 10 is then screwed into engagement with the thread 2 of the member 1 whereby the member 7 is drawn longitudinally along the hose 12 and the said hose is compressed to fill the furrows between the ridges of the thread 5. Therefore the end portion of the hose 12 is compressed and this will have a tendency to elongate the end portion of the hose whereby the extreme end of the hose passes along the surface of the boss 6 and butts in close contact against the shoulder 3. This effects a tight joint between the member 1 and the hose 12 and prevents leakage at the joint. The member 1 may be of any suitable form, that is to say, it may be in the form of a spigot or valve body or in a form of a pipe fitting as described.

From the foregoing description taken in conjunction with the accompanying drawing it will be seen that a hose coupling of simple and durable structure is provided and that the same securely confines the end of a hose in a manner to prevent leakage at the point where the hose is connected with the primary element of the coupling structure.

Having described the invention what is claimed is:—

A hose coupling comprising a member having an external thread and provided with a nipple having a substantially conical exterior surface which is threaded, said thread gradually increasing in size from its outer to its inner end, the outer end of the thread being spaced from the outer end of the nipple thereby leaving the exterior surface of the nipple at the outer end thereof smooth, there being provided at the inner end of the thread upon the nipple a conical portion having a concaved surface, said member also having a shoulder the surface of which merges into the said concave conical surface substantially at a tangent and which lies in a plane at a right angle to the axis of the nipple, another member adapted to receive the smooth end and a portion of the last mentioned thread of said nipple, and having an annular shoulder, the last mentioned member having a smooth bore of greater diameter than the external diameter of the nipple whereby the said member may slide on the nipple, and a union nut having a flange bearing against the shoulder upon the second mentioned member, said nut adapted to engage the first mentioned thread upon the first mentioned member.

In testimony whereof I affix my signature.

JAMES F. SIMMONS.

Witnesses:
CHARLES FLEMING,
HARRY R. FLEMING.